(12) United States Patent
Teich (10) Patent No.: US 9,745,053 B2
(45) Date of Patent: Aug. 29, 2017

(54) AERODYNAMIC COMPONENT AND METHOD FOR PRODUCING AN AERODYNAMIC COMPONENT

(71) Applicant: Airbus Operations GmbH, Hamburg (DE)

(72) Inventor: Benjamin Teich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 113 days.

(21) Appl. No.: 14/937,220

(22) Filed: Nov. 10, 2015

(65) Prior Publication Data

US 2016/0137292 A1    May 19, 2016

(30) Foreign Application Priority Data

Nov. 11, 2014   (EP) .................................... 14192676
Aug. 20, 2015   (DE) ........................ 10 2015 113 791

(51) Int. Cl.
*B64C 21/06*   (2006.01)
*B64C 3/20*   (2006.01)
*B64F 5/10*   (2017.01)

(52) U.S. Cl.
CPC ............. *B64C 21/06* (2013.01); *B64C 3/20* (2013.01); *B64C 2230/04* (2013.01); *B64C 2230/08* (2013.01); *B64F 5/10* (2017.01); *Y02T 50/166* (2013.01)

(58) Field of Classification Search
CPC ....... B64C 21/02; B64C 21/025; B64C 21/04; B64C 21/06; B64C 3/20; B64C 2230/08
See application file for complete search history.

(56) References Cited

U.S. PATENT DOCUMENTS 6,050,523 A    4/2000   Kraenzien
8,800,915 B2   8/2014   Gerber
(Continued)

FOREIGN PATENT DOCUMENTS

DE    196 49 132 A1      5/1998
DE    10 2010 014 641 A1  10/2011
GB    2256253             12/1992
(Continued)

OTHER PUBLICATIONS

European Search Report for Application No. EP 14 19 2676 dated Apr. 15, 2015.

*Primary Examiner* — Brian M O'Hara
(74) *Attorney, Agent, or Firm* — Jenkins, Wilson, Taylor & Hunt, P.A.

(57) ABSTRACT

An aerodynamic component which in particular is suitable for use in an aircraft includes an outer skin sheet having an inner surface and an outer surface and being provided with perforation openings allowing a flow of air therethrough. The outer surface of the outer skin sheet forms an aerodynamic surface of the aerodynamic component. The aerodynamic component further includes a sandwich panel which includes an outer layer facing the inner surface of the outer skin sheet, an inner layer facing away from the inner surface of the outer skin sheet and a foam core sandwiched between the outer layer and the inner layer. The sandwich panel is provided with connection openings extending through the sandwich panel between the outer layer and the inner layer and allowing a flow of air therethrough.

15 Claims, 8 Drawing Sheets

(56) References Cited

U.S. PATENT DOCUMENTS

2009/0210103 A1    8/2009  Cook
2015/0360766 A1*  12/2015  Gerber ..................... B64C 5/02
                                                        244/87

FOREIGN PATENT DOCUMENTS

WO    WO 2005/113336 A1    12/2005
WO    WO 2011/039285 A2     4/2011

* cited by examiner

AERODYNAMIC COMPONENT AND METHOD FOR PRODUCING AN AERODYNAMIC COMPONENT

CROSS-REFERENCE TO RELATED APPLICATIONS

This application claims priority to EP 14 192676.6 filed Nov. 11, 2014 and to DE 10 2015 113791.7 filed Aug. 20, 2015, the entire disclosures of which are incorporated by reference herein.

TECHNICAL FIELD

The disclosure herein relates to an aerodynamic component, in particular an aerodynamic aircraft component, and a method for producing an aerodynamic component of this kind.

BACKGROUND

In order to control a boundary layer developing adjacent to an aerodynamic surface exposed to a high speed air flow such as, for example, a surface and in particular a leading edge of an aerodynamic aircraft component, it is known in art to inject air into or to withdraw air from the boundary layer. EP 2 483 148 B1 and U.S. Pat. No. 8,800,915 B2 disclose an aircraft component comprising a surface for boundary layer suction on the outer skin of an aircraft where drawing off by boundary layer suction can take place. The composite component comprises a base body with an extruded profile made of a light metal, a plurality of stringers extruded from the base body and forming a plurality of open suction channels arranged next to one another on the base body, and a micro-perforated metal cover sheet made of titanium or a stainless steel as a corrosion-resistant metal applied to stringer heads thereby forming the surface where drawing off by boundary layer suction can take place.

SUMMARY

The disclosure herein is directed at an object of specifying a lightweight and easy to manufacture aerodynamic component which allows the control of a boundary layer developing adjacent to a surface thereof when being exposed to a high speed air flow. Furthermore, the disclosure herein is directed at an object of providing a method for efficiently producing an aerodynamic component of this kind.

These objects are achieved, at least in part or full, by an aerodynamic component having the features disclosed herein and a method for producing an aerodynamic component disclosed herein.

An aerodynamic component which is in particular suitable for use in an aircraft, for example as a leading edge of an engine nozzle, a wing or a vertical or horizontal stabilizer, comprises an outer skin sheet. The outer skin sheet has an inner surface as well as an outer surface and is provided with a plurality of perforation openings extending through the outer skin sheet and allowing a flow of air therethrough. In particular, the outer skin sheet is provided with micro-perforation openings which may be evenly distributed across the outer skin sheet. An outer surface of the outer skin sheet forms an aerodynamic surface of the aerodynamic component, i.e. in use of the aerodynamic component, for example, when the aerodynamic component is installed in an aircraft and the aircraft is in flight, the outer surface of the outer skin sheet is exposed to a high speed air flow. As a result, a boundary layer is formed across the aerodynamic surface of the aerodynamic component, i.e. the outer surface of the outer skin sheet.

The aerodynamic component further comprises a sandwich panel which includes an outer layer facing the inner surface of the outer skin sheet, an inner layer facing away from the inner surface of the outer skin sheet and a foam core sandwiched between the outer layer and the inner layer. The sandwich panel is provided with a plurality of connection openings extending through the sandwich panel between the outer layer and the inner layer and allowing a flow of air therethrough. Basically, the connection openings extending through the sandwich panel may be formed by open pores or pore channels which are present in the foam core of the sandwich panel anyway. Preferably, however, the connection openings are designed in the form of tubular channels which may extend through the sandwich panel substantially perpendicular to both, the inner and the outer layer of the sandwich panel. The tubular channels may simply be formed by bores extending through the sandwich panel. It is, however, also conceivable to provide the tubular channels with insertion elements in the form of, for example, sleeves which may be inserted into bores extending through the sandwich panel. Beside a reinforcing effect, insertion elements in the form of, for example, sleeves also provide for an increased geometrical accuracy of an inner surface of the tubular channels.

The aerodynamic component can be flown through with air via the perforation openings provided in the outer skin sheet and the connection openings extending through the sandwich panel. In use of the aerodynamic component, i.e. for example when the aerodynamic component is installed in an aircraft, a boundary layer formed across the aerodynamic surface of the aerodynamic component thus can be controlled by either injecting air into the boundary layer or by withdrawing air from the boundary layer. The aerodynamic component described herein is particularly suitable for use in an application wherein air should be withdrawn from the boundary layer forming across the aerodynamic surface of the aerodynamic component.

For example, a suction effect in the region of the aerodynamic surface of the aerodynamic component, i.e. in the region of the outer surface of the outer skin sheet can be achieved in an active manner by connecting the connection openings extending through the sandwich panel to a suction device which may, for example, be designed in form a pump. As an alternative, it is, however, also conceivable to connect the connection openings to a space wherein a pressure prevails which is lower than a pressure prevailing within the boundary layer formed across the aerodynamic surface of the aerodynamic component so as to withdraw air from the boundary layer in a passive manner. In any case, the design of the aerodynamic component ensures an unhindered flow of air through the outer skin sheet and the sandwich panel. By withdrawing air from the boundary layer, the formation of turbulences in the boundary layer can be reduced or even prevented. Instead, laminar flow characteristics can be maintained within the boundary layer thus allowing a significant reduction of the aerodynamic drag caused by the aerodynamic component in use.

By providing the aerodynamic component with a body made of a sandwich panel, the aerodynamic component is easy to manufacture even in case the aerodynamic component has a complex shape and surface typology. For example, an aerodynamic component comprising a base body made of a sandwich panel can be provided with a double curvature surface shape. In addition, the aerodynamic component, due to the use of a sandwich panel for making the base body of the aerodynamic component, is of a lightweight design. Finally, the aerodynamic component distinguishes by an excellent aerodynamic performance, since the outer skin sheet can be optimized with regard to its aerodynamic properties as desired or necessary.

For example, the outer skin sheet of the aerodynamic component may be made of a metallic material. Titanium, a titanium alloy, corrosion resistant steel alloys or aluminium alloys are suitable materials for manufacturing the outer skin sheet. At least one of the inner and the outer layer of the sandwich panel may be made of a fiber reinforced composite material. In particular, the inner and/or the outer layer of the sandwich panel may be made of a carbon fiber, a glass fiber and/or any other fiber reinforced plastic material. The plastic material may be a curable material, in particular a curable resin such as, for example, an epoxy resin.

In a surface region facing the outer skin sheet, the sandwich panel may be provided with a plurality of surface channels extending across the surface of the sandwich panel and connecting the perforation openings provided in the outer skin sheet to the connection openings extending through the sandwich panel. The surface channels thus ensure that air which is withdrawn from a boundary layer formed across the aerodynamic surface of the aerodynamic component is collected in a region of the aerodynamic component below the outer skin sheet and finally can be withdrawn via the connection openings extending through the sandwich panel. The surface channels thus ensure that a sufficient amount of air can be withdrawn from the boundary layer in all operational states of the aerodynamic component. The connection openings may extend through the sandwich panel in a direction substantially perpendicular to longitudinal axes of the surface channels extending across the surface of the sandwich panel, thus allowing the air withdrawn from the boundary layer via the perforation openings formed in the outer skin sheet and the surface channels to be conveyed through the sandwich panel along the shortest possible flow path.

The surface channels provided in the surface region of the sandwich panel which faces the outer skin sheet may extend substantially parallel to each other or radiant across the surface of the sandwich panel. The number of surface channels and/or the distance between adjacent surface channels may be adjusted in dependence on the desired air flow to be withdrawn from the boundary layer via the perforation openings formed in the outer skin sheet and the surface channels.

The surface channels may have a substantially rectangular, a substantially triangular, a substantially semi-circular or any other suitable cross-sectional shape. The connection openings extending through the sandwich panel may open into the surface channels in the region of the apex of the surface channels. In other words, the connection openings may open into the surface channels in a deepest region thereof, thus allowing a particularly efficient withdrawal of air from the surface channels via the connection openings.

In a preferred embodiment of the aerodynamic component, the plurality of surface channels extending across the surface of the sandwich panel are separated from each other by attachment portions which support the outer skin sheet of the aerodynamic component. The attachment portions thus are formed by surface regions of the sandwich panel which is in contact with and carries the outer skin sheet. For example, the surface of the sandwich panel may comprise a plurality of stripe-shaped attachment portions via which the sandwich panel, by a suitable joining method, may be connected to the outer skin sheet. In case the sandwich panel is provided with a plurality of surface channels extending substantially parallel to each other, also the attachment portions may extend substantially parallel to each other across the surface of the sandwich panel, thus ensuring that the outer skin sheet can be securely attached to and supported by the attachment portions of the sandwich panel.

The aerodynamic component may further comprise a reinforced edge region extending along at least a portion of a circumference of the inner layer of the sandwich panel. Like the inner layer of the sandwich panel, also the reinforced edge region may be made of a fiber reinforced composite material, in particular a carbon fiber, a glass fiber and/or any other fiber reinforced plastic material. The reinforced edge region may be provided for allowing the aerodynamic component to be installed in place and to be connected to an adjacent or supporting component by using suitable fasteners such as, for example, screws or rivets without impairing the mechanical properties of the aerodynamic component.

The aerodynamic component may further comprise at least one of an inner reinforcement sheet arranged between the inner layer and the foam core of the sandwich panel and an outer reinforcement sheet arranged between the foam core and the outer layer of the sandwich panel. The inner reinforcement sheet and/or the outer reinforcement sheet may extend across the entire surface area of the inner layer and the foam core of the sandwich panel, respectively. It is, however, also conceivable to provide the aerodynamic component with an inner reinforcement sheet and/or an outer reinforcement sheet which extend(s) across only a portion of the inner layer and the foam core of the sandwich panel, respectively. For example, a leading edge region of the aerodynamic component may be provided with an inner reinforcement sheet and/or an outer reinforcement sheet in order to increase the resistance of the aerodynamic component against bird strike. Like the reinforced edge region, also the inner and/or the outer reinforcement sheet may be made of a fiber reinforced composite material, in particular a carbon fiber, a glass fiber and/or any other fiber reinforced plastic material.

In a method for producing an aerodynamic component, an outer skin sheet is provided which has an inner surface and an outer surface and which is provided with a plurality of perforation openings allowing a flow of air therethrough. The outer surface of the outer skin sheet is adapted to form an aerodynamic surface of the aerodynamic component. Furthermore, a sandwich panel is provided which includes an outer layer, an inner layer and a foam core sandwiched between the outer layer and the inner layer. A plurality of connection openings are formed in the sandwich panel which extend through the sandwich panel between the outer layer and the inner layer and which allow a flow of air therethrough. The outer skin is attached to the sandwich panel in such a manner that the outer layer of the sandwich panel faces the inner surface of the outer skin sheet and such that the inner layer of the sandwich panel faces away from the inner surface of the outer skin sheet.

The outer skin sheet may be made of a metallic material, in particular of titanium, a titanium alloy, a corrosion resistant steel alloy or an aluminium alloy. At least one of the inner and the outer layer of the sandwich panel may be made of a fiber reinforced composite material, in particular a carbon fiber, a glass fiber and/or any other fiber reinforced plastic material.

The sandwich panel, in a surface region facing the outer skin sheet, may be provided with a plurality of surface panels extending across the surface of the sandwich panel and connecting the perforation openings provided in the outer skin sheet to the connection openings extending through the sandwich panel. The surface channels may extend substantially parallel to each other or radiant across the surface of the sandwich panel. Additionally or alternatively thereto, the connection openings may open into the surface channels in the region of an apex of the surface channels.

The outer skin sheet of the aerodynamic component may be attached to attachment portions of the sandwich panel which separate the plurality of surface channels extending across the surface of the sandwich panel from each other.

In a method for producing an aerodynamic component, the production of the sandwich panel may comprise a step of applying a semi-finished inner layer to a surface of a positive preform tool. The semi-finished inner layer may be a fiber prepreg, i.e. an arrangement of reinforcing fibers in the form of short fibers, long fibers, a fiber web or a fiber mesh which are impregnated with a curable material. Alternatively, the semi-finished inner layer may be a dry fiber arrangement, i.e. may consist of or comprise fibers which are not impregnated with a curable material. The positive preform tool receiving the semi-finished inner layer preferably resembles the shape of the aerodynamic component to be manufactured. In dependence on the complexity of the shape of the aerodynamic component to be manufactured, the semi-finished inner layer, when being applied to the surface of the preform tool, may be provided in only one piece or may comprise separate portions which are connected to each other during the following manufacturing steps described below.

A foam core of the sandwich panel may be applied onto the semi-finished inner layer. Preferably, the foam core already is provided with surface channels extending across a surface of the foam core. For example, the surface channels may be formed in the foam core upon solidifying or curing the foam core in a suitable forming tool. Alternatively, the surface channels may be formed in the foam core by a suitable shaping process such as machining or milling. Like the semi-finished inner layer, also the foam core, in dependence on the complexity of the shape of the aerodynamic component to be manufactured, may be provided in only one piece or may comprise separate portions.

A semi-finished outer layer may be applied onto the foam core. Like the semi-finished inner layer, also the semi-finished outer layer may be a fiber prepreg layer or a dry fiber arrangement. Further, also the semi-finished outer layer may be provided in only one piece or may comprise separate portions.

After stacking the semi-finished inner layer, the foam core and the semi-finished outer layer on top of each other onto the positive preform tool, the layer arrangement comprising the semi-finished inner layer, the foam core and the semi-finished outer layer may be moved from the positive preform tool into a negative forming tool in such a manner that an outer surface of the semi-finished outer layer which faces away from the foam core is in contact with a forming surface of the forming tool. The negative forming tool preferable resembles a negative form of the aerodynamic component to be manufactured.

A curable material, in particular a curable resin material may be injected into the semi-finished inner layer and the semi-finished outer layer. The injection of a curable material may involve the application of a vacuum to the semi-finished inner layer and the semi-finished outer layer. Thereafter, the curable material injected into the semi-finished inner layer and the semi-finished outer layer may be cured so as to provide the inner layer and the outer layer of the sandwich panel. The curing step may take place at an elevated temperature and/or pressure as desired. During the curing step multiple portions of the semi-finished inner layer, the semi-finished outer layer and/or the foam core are connected to each other. In addition, the semi-finished inner layer and the semi-finished outer layer are connected to the foam core.

The sandwich panel finally may be removed from the forming tool and the connection openings may be drilled into the sandwich panel at the desired locations.

In particular in case the foam core, upon being placed in the negative forming tool together with the semi-finished inner layer and the semi-finished outer layer, already is provided with surface channels extending across the surface of the foam core, core elements may be arranged in the forming tool and/or the layer arrangement prior to inserting the layer arrangement comprising the semi-finished inner layer, the foam core and the semi-finished outer layer into the forming tool. The core elements may be received within the surface channels extending across the surface of the foam core when the layer arrangement is arranged in the forming tool and thus may serve to force the semi-finished outer layer against the foam core. It may thus be ensured that the semi-finished outer layer closely follows the contour of the surface of the foam core which is provided with the surface channels.

The method for producing an aerodynamic component may further comprise the application of a semi-finished reinforced edge region to the surface of the positive preform tool which extends along at least a portion of the circumference of the semi-finished inner layer. The semi-finished reinforced edge region may be applied to the positive preform tool in only one piece or may comprise separate portions. A semi-finished inner reinforcement sheet may be arranged between the semi-finished inner layer and the foam core and/or a semi-finished outer reinforcement sheet may be arranged between the foam core and the semi-finished outer layer.

A curable material, in particular a curable plastic material such as, for example, a curable resin, may be injected into the semi-finished reinforced edge region, the semi-finished reinforcement sheet and/or the semi-finished outer reinforcement sheet. The curable material injected into at least one of the semi-finished reinforced edge region, the semi-finished inner reinforcement sheet and the semi-finished outer reinforcement sheet may be cured so as to provide at least one of a reinforced edge region extending along at least a portion of a circumference of the inner layer of the sandwich panel, an inner reinforcement sheet arranged between the inner layer and the foam core of the sandwich panel and an outer reinforcement sheet arranged between the foam core and the outer layer of the sandwich panel. The injection of the curable material and the curing of the curable material may be carried out as described above with respect to the inner and the outer layer of the sandwich panel. Preferably, the same curable material is injected into all semi-finished components in a single process step. The curable material then can be cured in a single further process step.

Finally, the outer skin sheet which already is provided with perforation openings may be attached to the sandwich panel in such a manner that the outer layer of the sandwich panel faces the inner surface of the outer skin sheet and such that the inner layer of the sandwich panel faces away from the inner surface of the outer skin sheet. In particular, the outer skin sheet may be attached to the attachment portions which in the final aerodynamic component support the outer skin sheet, for example by gluing.

BRIEF DESCRIPTION OF THE DRAWINGS

Preferred embodiments of the disclosure herein now are described in more detail with reference to the appended schematic drawings, wherein.

DETAILED DESCRIPTION

Figure 1:
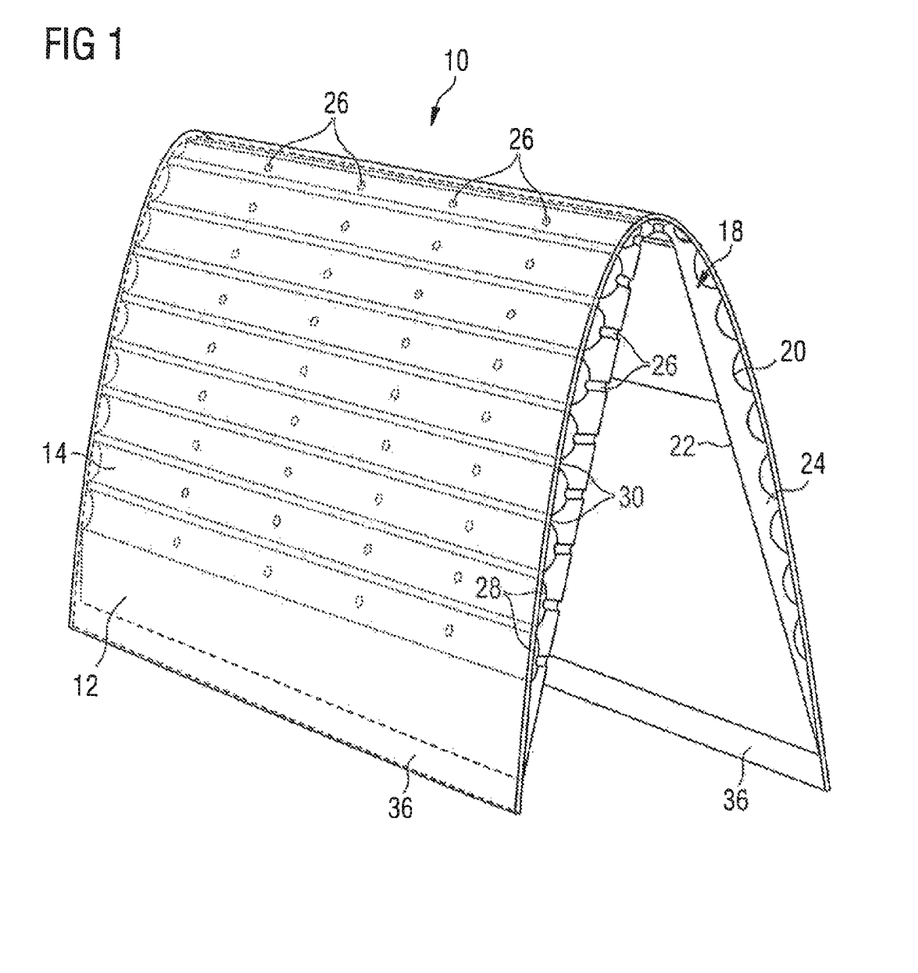
FIG. 1 shows an aerodynamic component in the form of a leading edge of a vertical stabilizer of an aircraft.
Figure 3:
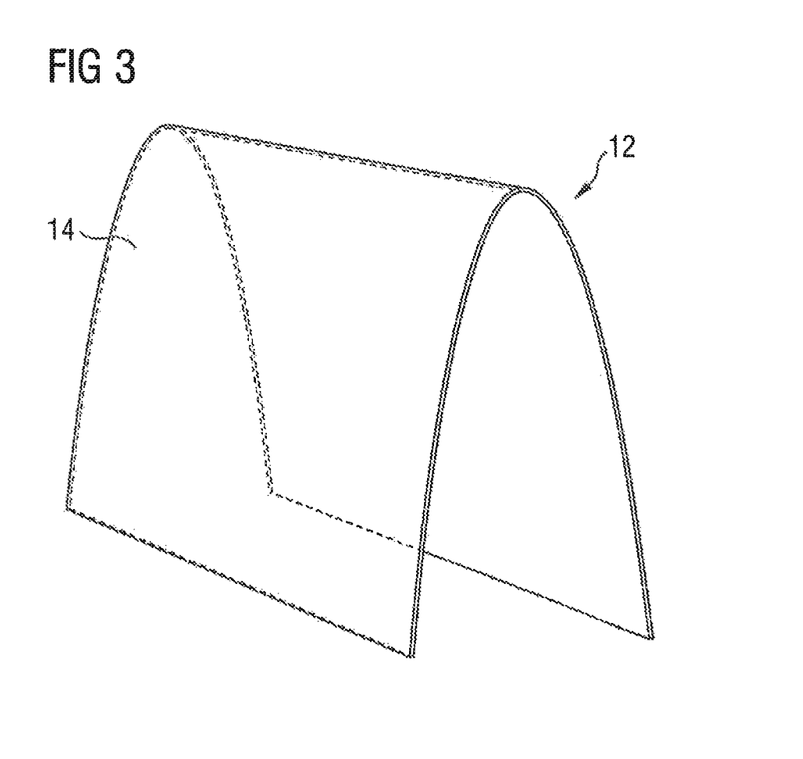
FIG. 3 shows an outer skin sheet of the aerodynamic component according to FIG. 1.

FIG. 1 shows aerodynamic component 10 which is suitable for use in an aircraft and designed in the form of a leading edge of a vertical stabilizer of the aircraft. The aerodynamic component 10 comprises an outer skin sheet 12 which is made of a metallic material, in particular of titanium, a titanium alloy, a corrosion resistant steel alloy or an aluminum alloy and which is provided with a plurality of perforation openings 14. The perforation openings 14, which are designed in the form of micro-perforations, are evenly distributed over the outer skin sheet 12. As becomes apparent in particular from FIG. 3, the outer skin sheet 12 has an inner surface and an outer surface, wherein the perforation openings 14 extend between the inner surface and the outer surface of the outer skin sheet 12 and are designed to allow a flow of air therethrough.

When the aerodynamic component 10 is installed in an aircraft and the aircraft is in flight, the outer surface of the outer skin sheet 12 forms an aerodynamic surface of the aerodynamic component 10 which is exposed to a high speed air flow. Thus, during flight operation of an aircraft equipped with the aerodynamic component 10, a boundary layer is formed across the outer surface of the outer skin sheet 12 which significantly influences the aerodynamic drag and hence the fuel consumption of the aircraft, in particular in case turbulences are formed within the boundary layer.

Figure 2:
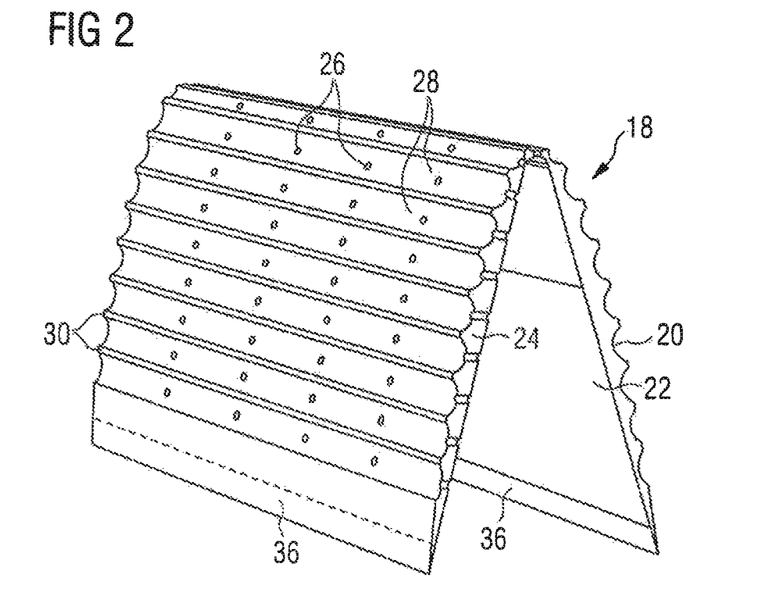
FIG. 2 shows a sandwich panel of the aerodynamic component according to FIG. 1.
Figure 4:
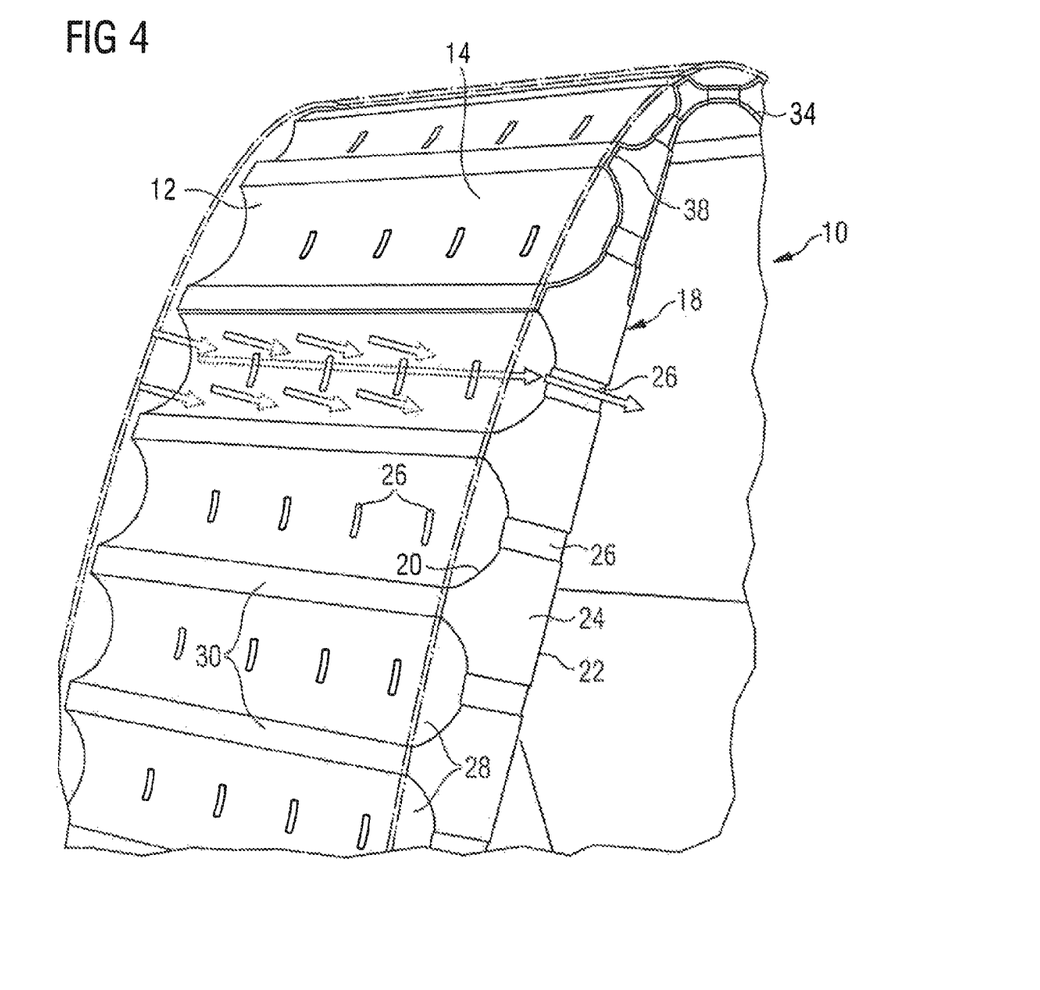
FIG. 4 shows an enlarged view of the aerodynamic component according to FIG. 1.

The aerodynamic component 10 further comprises a sandwich panel 18 depicted in greater detail in FIGS. 2 and 4. The sandwich panel 18 includes an outer layer 20 which faces the inner surface of the outer skin sheet 12 and an inner layer 22 facing away from the inner surface of the outer skin sheet 12 and delimiting an interior space of the aerodynamic component 10. The sandwich panel 18 further comprises a foam core 24 which is sandwiched between the outer layer 20 and the inner layer 22. Both the inner layer 22 and the outer layer 20 of the sandwich panel 18 are made of a fiber reinforced composite material, in particular a glass fiber reinforced plastic material. Alternatively, the inner layer 22 and the outer layer 20 of the sandwich panel 18 may be made of any other fiber reinforced plastic material. In the specific embodiment of an aerodynamic component 10 shown in the drawings, the inner and the outer layer 22, 20 of the sandwich panel 18 are made of a glass fiber reinforced resin.

As becomes apparent in particular from FIG. 4, the sandwich panel 18 is provided with a plurality of connection openings 26 which extend through the sandwich panel 18 between the outer layer 20 and the inner layer 22. Basically, the connection openings 26 may be formed by open pores which are present in the foam core 24 of the sandwich panel 18 anyway. In the embodiment of an aerodynamic component 10 shown in the drawings, the connection openings 26, however, have a tubular shape and extend substantially perpendicular to the outer and the inner layer 20, 22 of the sandwich panel 18. As will be explained in greater detail below, the connection openings 26 are formed into the sandwich panel 18 by drilling. Furthermore, if desired, insertion elements in the form of, for example, sleeves (not shown) may be inserted into the connection openings 26 machined into the sandwich panel 18 in order to provide for a reinforcing effect and/or in order to enhance the geometrical accuracy of an inner surface of the connection openings 26. Like the perforation openings 14 provided in the outer sheet 12, also the connection openings 26 extending through the sandwich panel 18 allow a flow of air therethrough.

The sandwich panel 18, in a surface region facing the outer skin sheet 12 is provided with a plurality of surface channels 28, see in particular FIG. 2. The surface channels 28 extend across the surface of the sandwich panel 18 substantially parallel to each other and connect the perforation openings 14 provided in the outer skin sheet 12 to the connection opening 26 extending through the sandwich panel 18. In particular, in the specific embodiment of an aerodynamic component 10 shown in the drawings, the surface channels 28 have a substantially semi-circular cross-sectional shape and the connection openings 26 open into the surface channels 28 in the region of an apex of the surface channels 28. Further, the connection openings 26 extend through the sandwich panel 18 in a direction substantially perpendicular to longitudinal axes of the surface channels 18.

The plurality of surface channels 28 extending across the surface of the sandwich panel 18 are separated from each other by attachment portions 30. Since the surface channels 28 extend across the surface of the sandwich panel 18 substantially parallel to each other, the attachment portions 30 are provided in the form of parallel stripes. The attachment portions 30 are in direct contact with the inner surface of the outer sheet 12, i.e. the outer skin sheet 12 is attached to the sandwich panel 18 via the attachment portions 30 and the attachment portions 30 support the outer skin sheet 12. Alternatively, the surface channels 28 and/or the attachment portions 30 may extend radiant across the surface of the sandwich panel 18.

The aerodynamic component 10 further comprises a reinforced edge region 36 extending along a circumference of the inner layer 22 of the sandwich panel 18, see FIG. 1. The reinforced edge region 36 is made of a fiber reinforced composite material, in particular a glass fiber reinforced resin and allows the aerodynamic component 10 to be installed in place and to be connected to an adjacent or supporting component by using suitable fasteners such as, for example, screws or rivets without impairing the mechanical properties of the aerodynamic component 10.

Finally, the aerodynamic component 10 comprises an inner reinforcement sheet 34 arranged between the inner layer 22 and the foam core 24 of the sandwich panel 18, and an outer reinforcement sheet 38 arranged between the foam core 24 and the outer layer 20 of the sandwich panel 18. Like the reinforced edge region 36, also the inner and the outer reinforcement sheet 34, 38 are made of a fiber reinforced composite material, in particular a glass fiber reinforced plastic material. The inner reinforcement sheet 34 and/or the outer reinforcement sheet 38 extend across a leading edge region of the aerodynamic component 10 and serve to increase the resistance of the aerodynamic component 10 against bird strike, hail strike or any other impact event.

In use of the aerodynamic component 10, i.e. when the aerodynamic component 10 is installed in an aircraft and the aircraft is in flight, it is possible to control the flow characteristics of the boundary layer forming across the aerodynamic surface, i.e. the outer surface of the outer skin sheet 12 by withdrawing air from the boundary layer through the aerodynamic component 10. Specifically, air may be withdrawn from the boundary layer either in an active manner by a pump or in a passive manner by connecting an interior space of the aerodynamic component 10 to a low pressure region of the aircraft. In any case, air may be withdrawn from the boundary layer through the perforation openings 14 provided in the outer skin sheet 12 and received in the surface channels 18 extending across the surface of the sandwich panel 18. From the surface channels 18, the air may be drawn through the connection openings 26 and conveyed into an interior space of the aerodynamic component 10.

By withdrawing air from the boundary layer formed across the aerodynamic surface of the aerodynamic component 10, the flow characteristics within the boundary layer can be controlled. In particular, the formation of turbulences can be reduced or even avoided, thus maintaining substantially laminar flow characteristics in the boundary layer. As a result, the aerodynamic drag caused by the aerodynamic component 10 and hence the fuel consumption of an aircraft equipped with the aerodynamic component 10 can be reduced. The aerodynamic component 10 thus allows an efficient control of the flow characteristics of the boundary layer formed across the aerodynamic surface of the aerodynamic component 10 while still being of a lightweight design and while being relatively easy to manufacture as will be described in more detail further below.

A method for producing the aerodynamic component 10 according to FIG. 1 is shown in FIGS. 5a-h. In a first step, see FIG. 5a, a semi-finished inner layer 22', which is intended to form the inner layer 22 of the sandwich panel 18, is applied to a surface of a positive preform tool 32. In the specific embodiment of an aerodynamic component 10 discussed herein, the semi-finished inner layer 22' is designed in the form of a dry glass fiber mat. Further, the semi-finished inner layer 22' is applied to the preform tool 32 in three portions in order to allow the semi-finished inner layer 22' to follow the surface contour of the preform tool 32. Of course, it is also conceivable to use a semi-finished inner layer 22' which is separated into less or more than three portions or which is not separated at all.

Figure 5A:
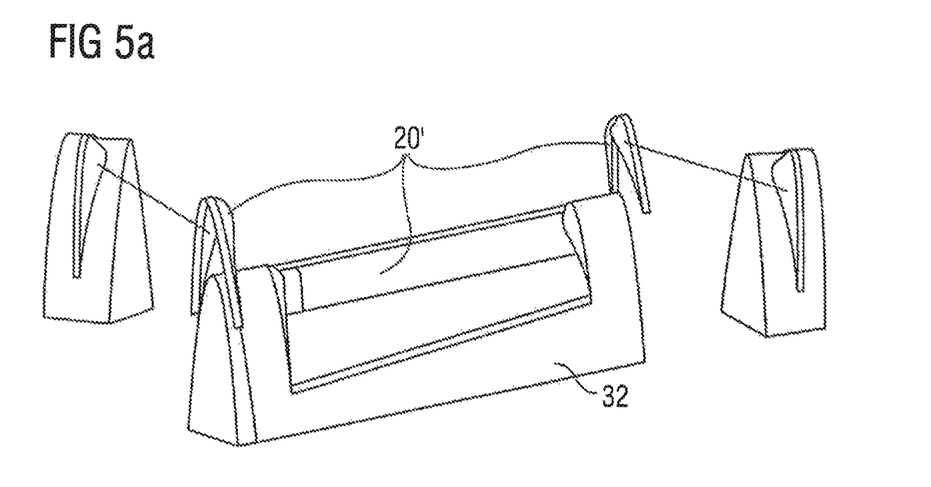
FIGS. 5a-h show a method for producing the aerodynamic component according to FIG. 1.
Figure 5B:
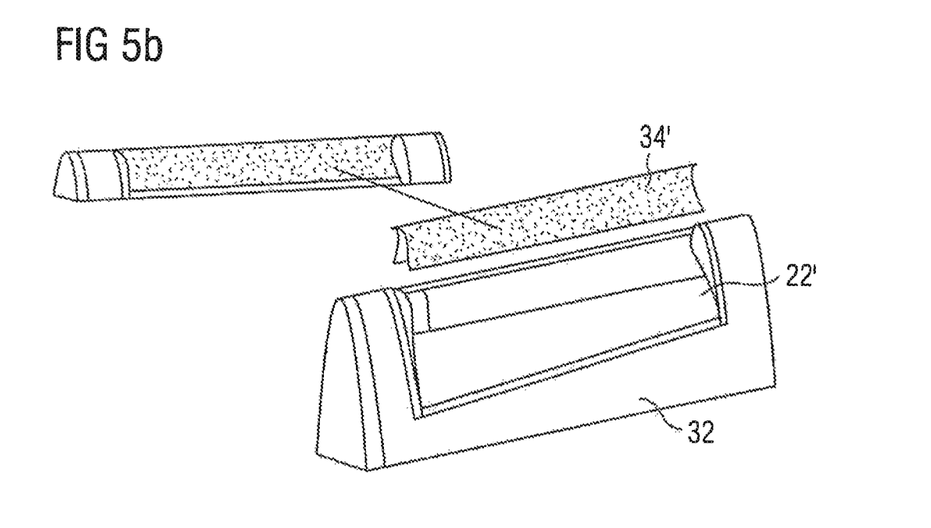
Figure 5C:
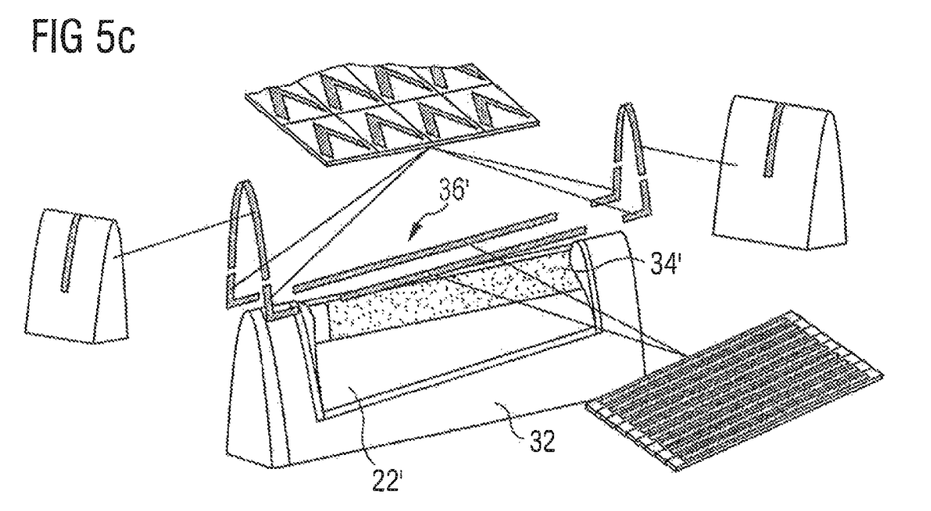

Thereafter, a semi-finished inner reinforcement sheet 34' which is intended to form the inner reinforcement sheet 34 and which, like the semi-finished inner layer 22', is designed in the form of a dry glass fiber laminate is applied onto the semi-finished inner layer 22', see FIG. 5b. In addition, a semi-finished reinforced edge region 36' which is divided into several portions so as to follow the circumference of the semi-finished inner layer 22' and which is intended to form the reinforced edge region 36 is applied to the preform tool 32, see FIG. 5c. Also the semi-finished reinforced edge region 36' is designed in the form of a dry glass fiber mat.

Figure 5D:
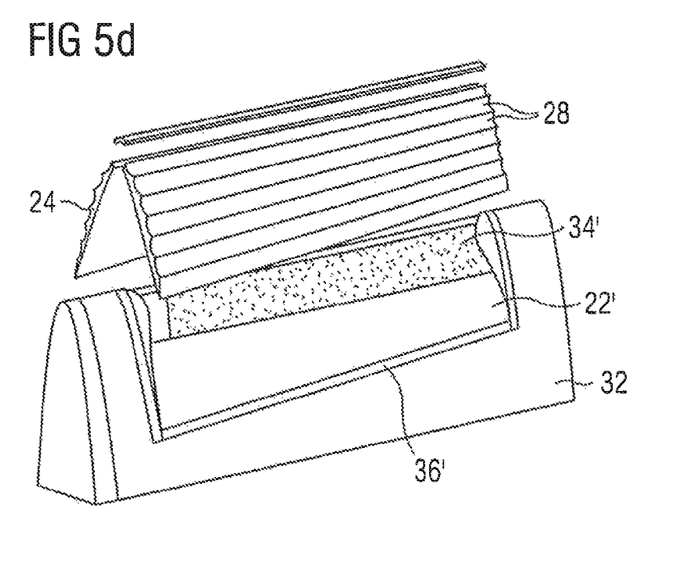

In a next step, the foam core 24 of the sandwich panel is applied onto the semi-finished inner layer 22', see FIG. 5d. Again, in order to follow the contour of the preform tool 32, the foam core 24 is divided into three portions. Of course, it is also conceivable to use a foam core 24 which is separated into less or more than three portions or which is not separated at all. Furthermore, the foam core 24 is already provided with surface channels 28' which extend across the surface of the foam core 24 and which in the final aerodynamic component 10 serve to form the surface channels 28.

Figure 5E:
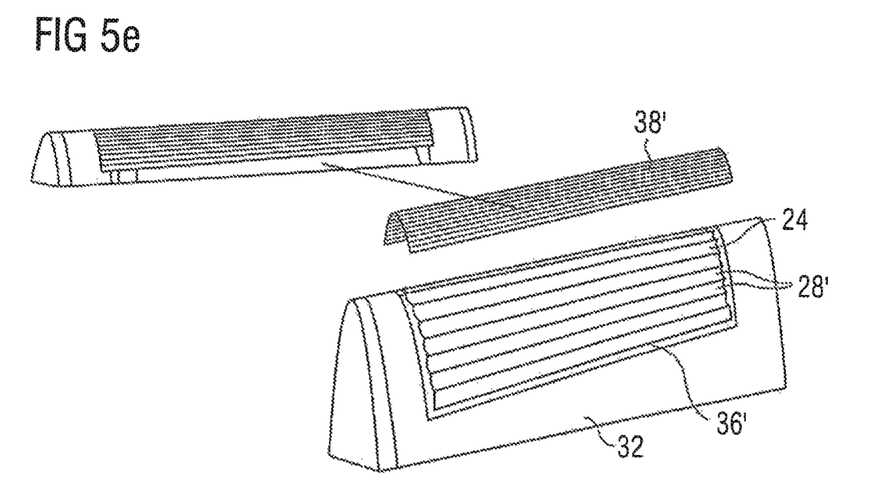

In a next step depicted in FIG. 5e, a semi-finished outer reinforcement sheet 38' is applied onto the foam core 24 which, like the semi-finished reinforcement sheet 34' extends across a leading edge region of the aerodynamic component 10 to be manufactured. The semi-finished outer reinforcement sheet 38' is designed in the form of a dry glass fiber laminate and is intended to form the outer reinforcement sheet 38 which, in the final aerodynamic component 10, is provided between the foam core 24 and the outer layer 20 of the sandwich panel 18.

Figure 5F:
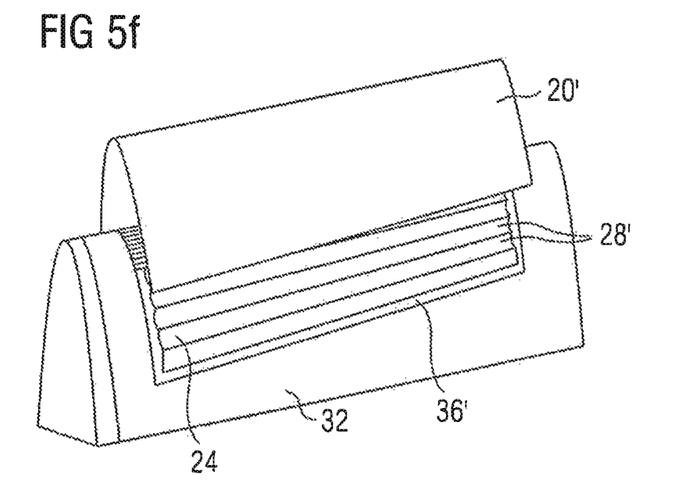

In a next step, a semi-finished outer layer 20' is applied onto the foam core 24, see FIG. 5f. The semi-finished outer layer 20' also is designed in the form of a dry fiber laminate and intended to form the outer layer 20 of the sandwich panel 18.

Figure 5G:
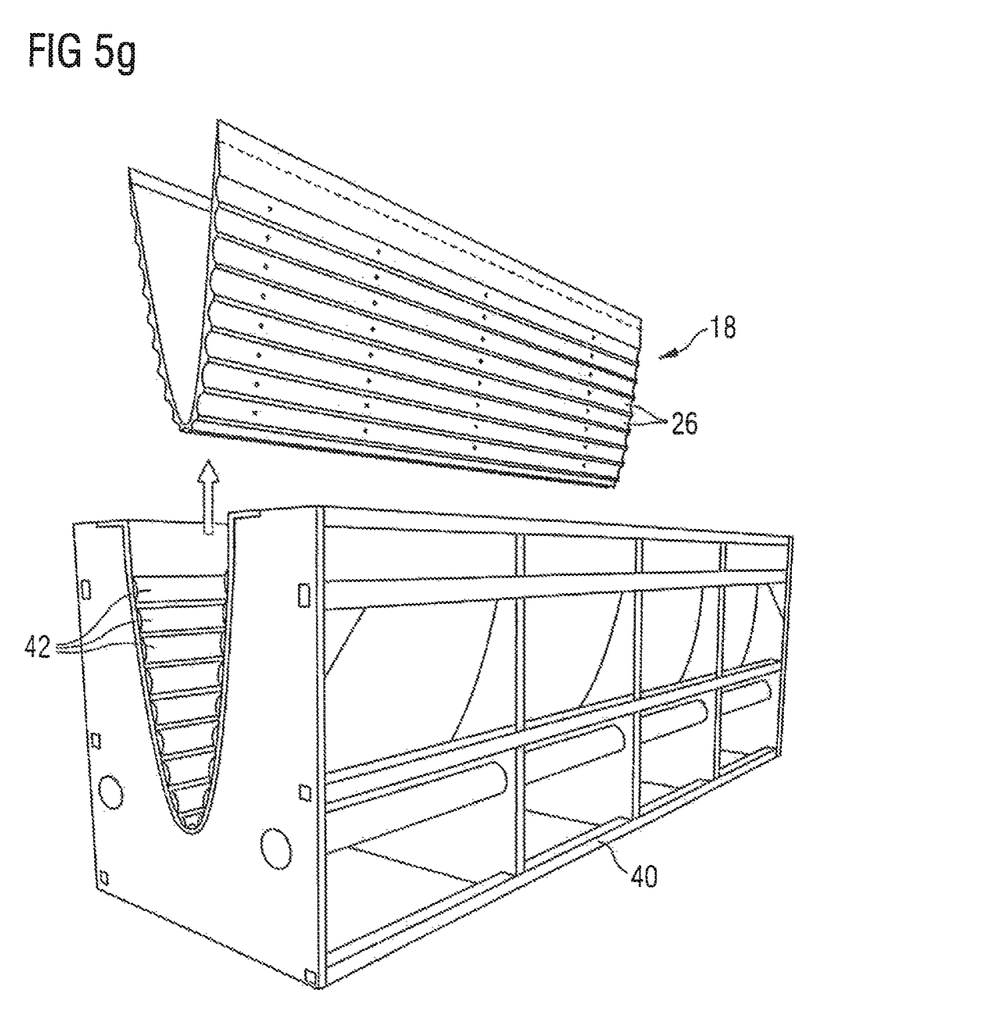

The layer arrangement comprising the semi-finished inner layer 22', the foam core 24, the semi-finished outer layer 20' and the semi-finished reinforcement components 34', 36', 38' are moved from the positive preform tool 32 into a negative forming tool 40 depicted in FIG. 5g in such a manner that an outer surface of the semi-finished outer layer 20' which faces away from the foam core 24 comes into contact with a forming surface of the forming tool 40. Prior to inserting the layer arrangement into the forming tool 40, core elements 42 are arranged in the forming tool 40 and/or the layer arrangement which are received within the surface channel 28' extending across the surface of the foam core 24 when the layer arrangement is arranged in the forming tool 40. The core elements 42 serve to force the semi-finished outer layer 20' against the foam core 24 and hence to closely follow the surface contour of the foam core 24.

In a next step, a curable material, in particular a resin material, is injected into the layer arrangement and distributed within the semi-finished outer layer 20', the semi-finished inner layer 22' and the semi-finished reinforcement components 34', 36', 38'. The injection of the curable material may involve the application of a vacuum in order to enhance the distribution of the material within the layer arrangement. Finally, the curable material injected into the layer arrangement is cured at an elevated temperature and/or at an elevated pressure as desired. The sandwich panel 18 then is removed from the forming tool 40 and the connection openings 26 are drilled, see FIG. 5g.

Figure 5H:
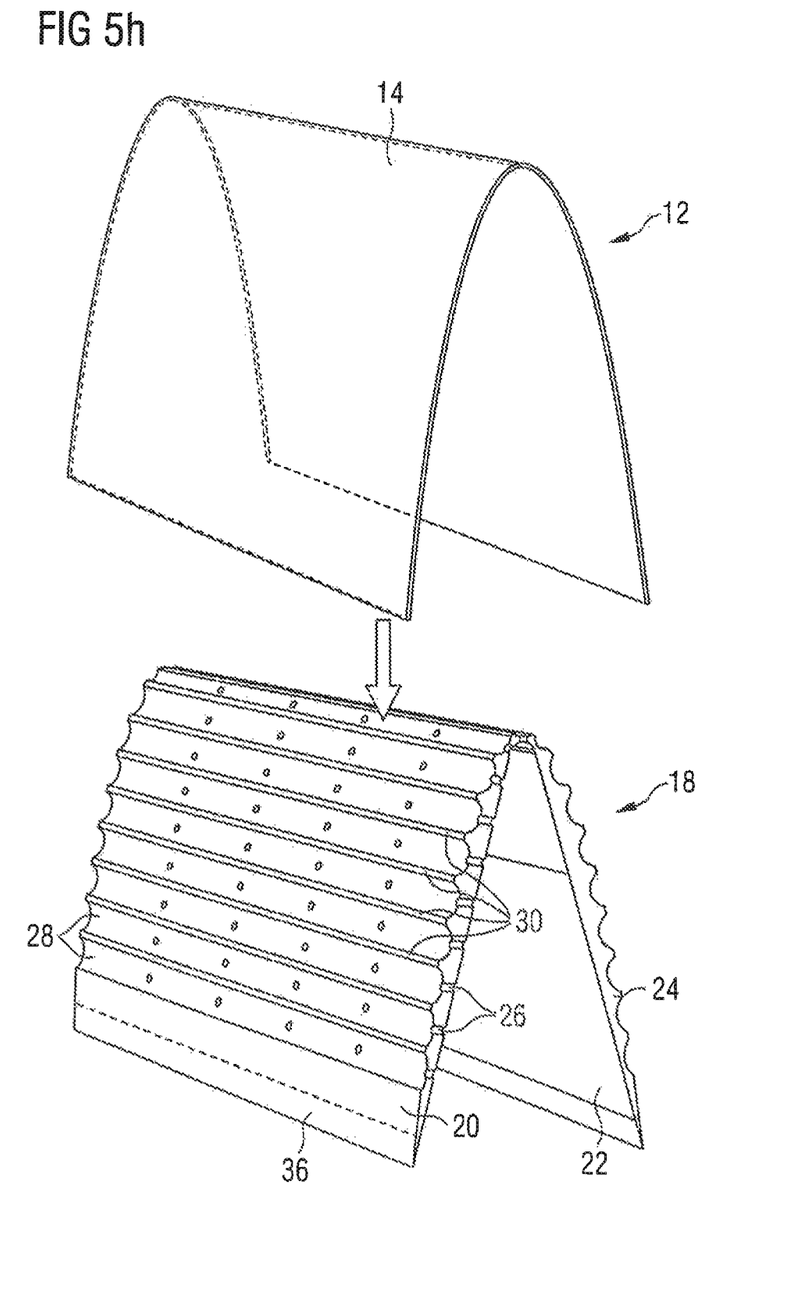

In a last step depicted in FIG. 5h, the outer skin sheet 12 which already is provided with the perforation openings 14 is attached to the sandwich panel 18 in such a manner that the outer layer 20 of the sandwich panel 18 faces the inner surface of the outer skin sheet 12 and such that the inner layer 22 of the sandwich panel 18 faces away from the inner surface of the outer skin sheet 12. In particular, the outer skin sheet 12 is attached to the attachment portions 30 which in the final aerodynamic component 10 support the outer skin sheet 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aerodynamic component for use on an aircraft, the component comprising:
   an outer skin sheet having an inner surface and an outer surface and being provided with a plurality of perforation openings allowing a flow of air therethrough, wherein the outer surface of the outer skin sheet forms an aerodynamic surface of the aerodynamic component; and
   a sandwich panel including:
      an outer layer facing the inner surface of the outer skin sheet,
      an inner layer facing away from the inner surface of the outer skin sheet,
      a foam core sandwiched between the outer layer and the inner layer,
      a plurality of connection openings each extending through the foam core, the outer layer and the inner layer and allowing a flow of air through the sandwich panel, and
      in a surface of the sandwich panel facing the outer skin sheet, a plurality of surface channels extending across the surface and connecting the perforation openings in the outer skin sheet to the connection openings extending through the sandwich panel.

2. The aerodynamic component according to claim 1, wherein the outer skin sheet is made of a metallic material, selected from the group of: titanium, a titanium alloy, a corrosion resistant steel alloy or an aluminum alloy.

3. The aerodynamic component according to claim 1, wherein at least one of the inner and the outer layer of the sandwich panel is made of a fiber reinforced composite material, selected from the group of: a carbon fiber or glass fiber reinforced plastic material.

4. The aerodynamic component according to claim 1, wherein the surface channels extend substantially parallel to each other across the surface of the sandwich panel.

5. The aerodynamic component according to claim 1, wherein the connection openings open into the surface channels in the region of an apex of the surface channels.

6. The aerodynamic component according to claim 1, wherein the plurality of surface channels extending across the surface of the sandwich panel are separated from each other by attachment portions which support the outer skin sheet of the aerodynamic component.

7. The aerodynamic component according to claim 1, further comprising at least one of:
   a reinforced edge region extending along at least a portion of a circumference of the inner layer of the sandwich panel;
   an inner reinforcement sheet arranged between the inner layer and the foam core of the sandwich panel; and
   an outer reinforcement sheet arranged between the foam core and the outer layer of the sandwich panel.

8. A method for producing an aerodynamic component for use on an aircraft, the method comprising:
   providing an outer skin sheet having an inner surface and an outer surface and being provided with a plurality of perforation openings allowing a flow of air therethrough, wherein the outer surface of the outer skin sheet is adapted to form an aerodynamic surface of the aerodynamic component; and
   providing a sandwich panel which includes an outer layer, an inner layer and a foam core sandwiched between the outer layer and the inner layer;
   forming a plurality of connection openings in the sandwich panel which each extend through the foam core, the outer layer, and the inner layer and allow a flow of air through the sandwich panel;
   providing a plurality of surface channels extending across a surface of the outer layer of the sandwich panel; and
   attaching the outer skin sheet to the sandwich panel such that:
      the outer layer of the sandwich panel faces the inner surface of the outer skin sheet,
      the inner layer of the sandwich panel faces from the inner surface of the outer skin sheet, and
      the plurality of surface channels fluidly connect the perforation openings provided in the outer skin sheet to the connection openings extending through the sandwich panel.

9. The method according to claim 8, wherein the outer skin sheet is made of a metallic material, selected from a group consisting of titanium, a titanium alloy, a corrosion resistant steel alloy and an aluminum alloy.

10. The method according to claim 8, wherein at least one of the inner and the outer layer of the sandwich panel is made of a fiber reinforced composite material, selected from a group consisting of a carbon fiber and glass fiber reinforced plastic material.

11. The method according to claim 8, wherein the surface channels extend substantially parallel to each other across the sandwich panel and wherein the connection openings open into the surface channels in a region of an apex of the surface channels.

12. The method according to claim 8, wherein the outer skin sheet of the aerodynamic component is attached to attachment portions of the sandwich panel which separate the plurality of surface channels extending across the surface of the sandwich panel from each other.

13. The method according to claim 8, further comprising at least one of:
   applying the inner layer as a semi-finished inner layer to a surface of a positive preform tool;
   applying the foam core onto the semi-finished inner layer;
   applying the outer layer as a semi-finished outer layer onto the foam core;
   moving the layer arrangement comprising the semi-finished inner layer, the foam core and the semi-finished outer layer from the positive preform tool into a negative forming tool in such a manner that an outer surface of the semi-finished outer layer which faces away from the foam core is in contact with a forming surface of the forming tool;
   injecting a curable material into the semi-finished inner layer and the semi-finished outer layer;
   curing the curable material injected into the semi-finished inner layer and the semi-finished outer layer so as to provide the inner layer and the outer layer of the sandwich panel;
   removing the sandwich panel from the forming tool; or
   forming the connection openings by drilling into the sandwich panel.

14. The method according to claim 13, wherein core elements are arranged in at least one of the forming tool and the layer arrangement which are received within the surface channels when the layer arrangement is arranged in the forming tool so as to force the semi-finished outer layer against the foam core.

15. The method according to claim 13, further comprising at least one of:
- applying a semi-finished reinforced edge region to the surface of the positive preform tool which extends along at least a portion of a circumference of the semi-finished inner layer;
- arranging a semi-finished inner reinforcement sheet between the semi-finished inner layer and the foam core;
- arranging a semi-finished outer reinforcement sheet between the foam core and the semi-finished outer layer;
- injecting a curable material into at least one of the semi-finished reinforced edge region, the semi-finished inner reinforcement sheet and the semi-finished outer reinforcement sheet; or
- curing the curable material to provide at least one of a reinforced edge region extending along at least a portion of a circumference of the inner layer of the sandwich panel, an inner reinforcement sheet arranged between the inner layer and the foam core of the sandwich panel and an outer reinforcement sheet arranged between the foam core and the outer layer of the sandwich panel.

* * * * *